United States Patent
Vijay et al.

(10) Patent No.: US 12,051,126 B2
(45) Date of Patent: Jul. 30, 2024

(54) MULTI USER COLLECTIVE PREFERENCES PROFILE

(71) Applicant: CurioSearch, Milpitas, CA (US)

(72) Inventors: Bharat Vijay, Fremont, CA (US); Anand Ramani, Pleasanton, CA (US); Rohit Jain, Danville, CA (US); K. N. Amarnath, Bengaluru (IN); Karpagam Gobalakrishna, Pleasanton, CA (US); Amar K Ray, Milpitas, CA (US)

(73) Assignee: UNISENSE TECH, INC., Milpitas, CA (US)

( * ) Notice: Subject to any disclaimer, the term of this patent is extended or adjusted under 35 U.S.C. 154(b) by 356 days.

(21) Appl. No.: 17/392,437

(22) Filed: Aug. 3, 2021

(65) Prior Publication Data

US 2022/0375011 A1    Nov. 24, 2022

Related U.S. Application Data

(63) Continuation-in-part of application No. 17/308,203, filed on May 5, 2021, now abandoned.

(51) Int. Cl.
| | |
|---|---|
| G06Q 30/00 | (2023.01) |
| G06N 20/00 | (2019.01) |
| G06Q 40/06 | (2012.01) |
| G06Q 50/16 | (2012.01) |
| G06V 30/40 | (2022.01) |

(52) U.S. Cl.
CPC ............ *G06Q 50/16* (2013.01); *G06N 20/00* (2019.01); *G06Q 40/06* (2013.01); *G06V 30/40* (2022.01)

(58) Field of Classification Search
None
See application file for complete search history.

(56) References Cited

U.S. PATENT DOCUMENTS

| | | | |
|---|---|---|---|
| 7,756,753 | B1 | 7/2010 | McFarland |
| 8,806,536 | B2 | 8/2014 | Ellis et al. |
| 2016/0342902 | A1* | 11/2016 | Pinckney ............... G06Q 30/02 |

FOREIGN PATENT DOCUMENTS

| | | |
|---|---|---|
| CA | 2767688 C | 12/2010 |
| WO | 9904143 A1 | 9/1999 |

* cited by examiner

*Primary Examiner* — Mila Airapetian
(74) *Attorney, Agent, or Firm* — Vani Moodley, Esq.

(57) ABSTRACT

Described herein is a method by which more than one person is enabled to actively participate in the process of finalizing a real estate property either for purchase or rent. Each deciding party is enabled to create a custom style profile capturing their individual preferences at an attribute level by providing both visual and verbal feedback. A Collective Preferences Profile (CPP) is created by integrating the multiple style profiles of the chosen deciding parties. The generated CPP is then utilized to curate the different houses available and to surface those houses that are most likely to fit the aesthetic and requirements of the combined audience. The CPP evolves on an ongoing basis by active solicitation of feedback on properties viewed or waitlisted to accommodate changing preferences and provide the most suited recommendation at any time.

20 Claims, 3 Drawing Sheets

MULTI USER COLLECTIVE PREFERENCES PROFILE

CROSS REFERENCE TO RELATED APPLICATION

The present application is a continuation in part of U.S. patent application Ser. No. 17/308,203, filed May 5, 2021 and entitled "A METHOD AND SYSTEM FOR CUSTOMER ENGAGEMENT" the entire contents of which are hereby incorporated by reference herein.

BACKGROUND

This invention in general relates to ecommerce, and specifically relates to a method and system of engaging with a user in a real estate purchasing or renting activity.

Typically more than one user are involved in the decision making process of real estate property selection. The complex decision making process hinges on more than one user's preferences and is also based on a multiplicity of attributes. In the current art, there is a lack of effective tools to accurately map the multiplicity of purchaser's intents with the available and suitable real estate property.

In the current online ecommerce environment, the products and services presented to a customer are at an individual level. When presented at a group level, the preferences are mapped either to geographical coordinates or assumes generic cultural group preferences based on commonality on dimensions such as language, culture, location etc. However, in actuality, true preferences of a group are based inherently at an individual behavioural level, and when such individual preferences are aggregated, the combined preference of the group may be significantly different from simplistically derived generic group preferences.

In most cases, there are contradictions in the preferences of users that must be resolved. In addition, users may not know exactly their future demands from the real estate property. There is an unmet need to resolve the before mentioned contradictions and help users identify their requirements accurately.

SUMMARY OF THE INVENTION

Advantageously, described herein is a method by which more than one person is enabled to actively participate in the purchase or rent of a house.

In one aspect of the invention, each user is enabled to create their custom profile capturing their individual preferences at an attribute level utilizing both verbal and written profiles. This is achieved either through a questionnaire or a visual medium.

In another aspect of the invention, a unified preferences profile is created by integrating the multiple individual preference profiles of the deciding users.

The collective preference profile is utilized to curate the different real estate properties available and surface those real estate properties that are most likely to fit the aesthetic and combined requirements of the audience.

The collective preference profile evolves on an ongoing basis by active solicitation of feedback on properties viewed or waitlisted to accommodate changing preferences and provide the most suited recommendation at any time.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer implemented method of determining collective preferences of a plurality of users engaged in purchase or rent of a real estate property. The computer implemented method of determining collective preferences also includes presenting a call to action to a first user on whether said first user wants to include a second user in a purchasing decision; presenting a questionnaire to the first user for textual inputs and also receiving visual inputs from the first user; if said second user is to be included in the purchasing decision, interacting with said second user or each of said plurality of users in both textual and visual media and generating a custom preference for said second user or each of said plurality of users; if there is a contradiction between preferences of two or more of said plurality of users, directing the users to reconcile amongst themselves to provide their compromised choice; creating a collective preferences profile by integrating multiple individual preference profiles of said plurality of users, where said collective preferences profile is utilized to curate a plurality of available real estate properties and surface those real estate properties of the plurality of available real estate properties that are most likely to fit combined aesthetic and functional requirements of said plurality of users; and applying said collective preferences profile to present a curated product to said first user. Other embodiments of this aspect include corresponding computer systems, apparatus, and computer programs recorded on one or more computer storage devices, each configured to perform the actions of the methods.

Implementations may include one or more of the following features. The computer implemented method where said step of creating a collective preferences profile further may include the steps of: determining an utility function of each of said users, $u\_i$, where $Uib = Pbb \in BPb$ and where p is a probability that a user will click on a given product, and where basket, b, is a collection of attributes $b=lmjm$ where $lmjm$ is an attribute in learning unit m with attribute value $mj$; determining a group utility function, u, where $U=k=1$ $kUk$; and maximizing the group utility function by performing the operation maxbEBU to optimize the basket across k users on a joint restricted space, where $B=i=1$ $kBi$, and where B is the joint restricted space of baskets Bi Said first user is presented with a choice as a prompt to confirm whether a style profile of said second user or a style profile of said plurality of users can be collectively used for selecting said real estate. Said users are provided an option to use a prebuilt persona, where said prebuilt persona is a ready-made style for ready integration into a style profile of a user. The computer implemented method may include applying a decomposition process that yields a first matrix representative of facets of intrinsic facets and a second matrix representative of facets of behavioural facets for said prebuilt personas. Rows of said second matrix of said behavioural facets is interpreted as "homebuyers", "long-term investors", or "buy-to-let investors". Said first matrix of said intrinsic facets is interpreted as "high-income group", "upper-middle-income group", "lower-middle-income group", and "low-income group". Said collective preferences profile evolves on an ongoing basis by active solicitation of feedback on properties viewed or waitlisted to accommodate changing preferences, and providing the most suited recommendation. For each real estate, preferences of said first user and second user or the plurality of users visited is extracted, and an intersection set and union set of preferences is computed, and where an index is derived by dividing the intersection set size by the size of the union set for an indication of similarity between a plurality of real estates. Said weightage is allocated per person for a specific area or attribute within the real estate property; and where said step of creating a collective preferences profile by integrating multiple individual preference profiles of said plurality of users, further may include the steps of: determining an utility function of each of said users, $u\_i$, where Uib=Pbb∈BPb and where p is a probability that a user will click on a given product, and where basket, b, is a collection of attributes b=lmjm where lmjm is an attribute in learning unit m with attribute value mj; determining a group utility function, u, where U=k=1 kUk; and maximizing the group utility function by performing the operation maxbEBU to optimize the basket across k users on a joint restricted space, where B=i=1 kBi, and where B is the joint restricted space of baskets Bi A text extraction algorithm is applied to non structured textual input received from a seller of said real estate property on a website to capture information about said real estate property, and in addition utilize visual inputs of said seller to identify parameters not identified by the text. Said text extraction algorithm may include creation of word clouds for different range of real estates and reviews descriptions of houses associated with them, and where said word clouds and said description is subject to a machine learning model using a tf-idf vectorizer, and determine those features that impact a real estate model. A taxonomy is built of the most preferred attributes that have a significant impact on a purchase decision. Each of said individual preference profiles and said collective preferences profile are placed in an explicit framework that the user can engage with, and the user can fine tune the collective preferences on an ongoing basis. Implementations of the described techniques may include hardware, a method or process, or computer software on a computer-accessible medium.

One general aspect includes a system for generating collective preferences of a plurality of users engaged in purchase or rent of a real estate property. The system also includes at least one processor; a non-transitory computer readable storage medium communicatively coupled to said at least one processor, said non-transitory computer readable storage medium configured to store modules, said at least one processor configured to execute said modules; and said modules may include: a call to action module for generating prompts for said users to include one more other users for collective shopping; a reconciliation module for resolving contradictions between preferences of users; a collective preferences modules module for analysing custom profiles of each of said plurality of users; a style machine module that records each of analysed style profiles of said plurality of users, and presents product or service options to each of said plurality of users and generates an integrated style profile of the plurality of users; and a recommendation engine for generating and presenting a curated product to be displayed to said plurality of users based on said integrated style profile. Other embodiments of this aspect include corresponding computer systems, apparatus, and computer programs recorded on one or more computer storage devices, each configured to perform the actions of the methods.

Implementations may include one or more of the following features. The system where said system is a cloud-based system with a collection of computer servers. Said call to action is appended as a link on a product page of a website, where said link may be accessed directly by circumventing a prompt of said call to action. Said generation of integrated style profile of said plurality of users is conducted at an attribute level. Said generation of integrated style profile of said plurality of users is conducted at a product level. Implementations of the described techniques may include hardware, a method or process, or computer software on a computer-accessible medium.

DETAILED DESCRIPTION

In the following description, for purposes of explanation, numerous specific details are set forth in order to provide a thorough understanding of the invention. It will be apparent, however, to one skilled in the art that the invention may be practiced without these specific details. In other instances, structures and devices are shown in block diagram form only in order to avoid obscuring the invention.

Reference in this specification to "one embodiment" or "an embodiment" means that a particular feature, structure, or characteristic described in connection with the embodiment is included in at least one embodiment of the invention. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Moreover, although the following description contains many specifics for the purposes of illustration, anyone skilled in the art will appreciate that many variations and/or alterations to said details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon, the invention.

Broadly, embodiments of the present invention disclose a technique by which more than one person is enabled to actively participate in the purchase of a house. The technique however, it is to be understood that the present technology may be applied to provide recommendations for any type of real estate not limiting to houses, commercial establishments, sports avenues, conference halls, business complexes, and shared work spaces.

Figure 2:
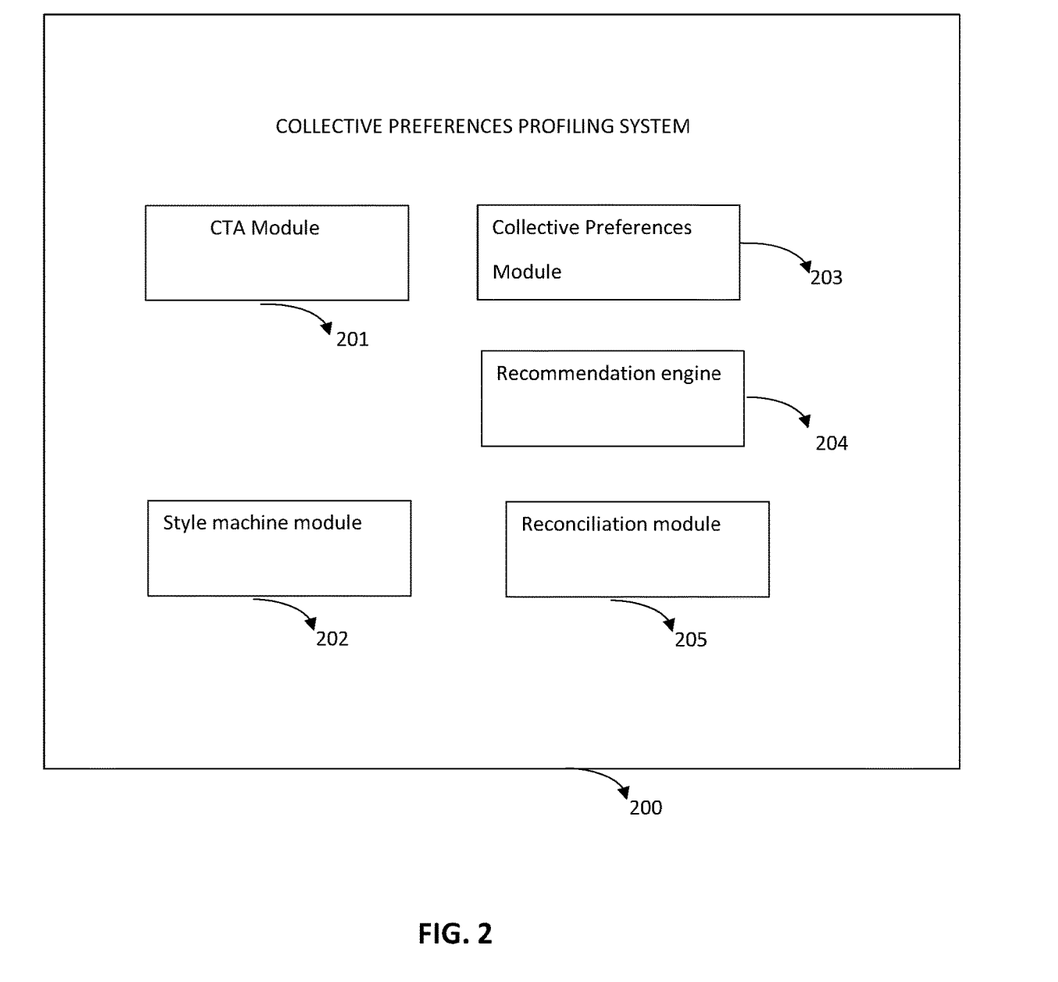
FIG. 2 illustrates a system for engaging with a plurality of users in a real estate purchasing or renting activity.

FIG. 2 illustrates a system for engaging with a plurality of users in a real estate purchasing or renting activity.

Figure 3:
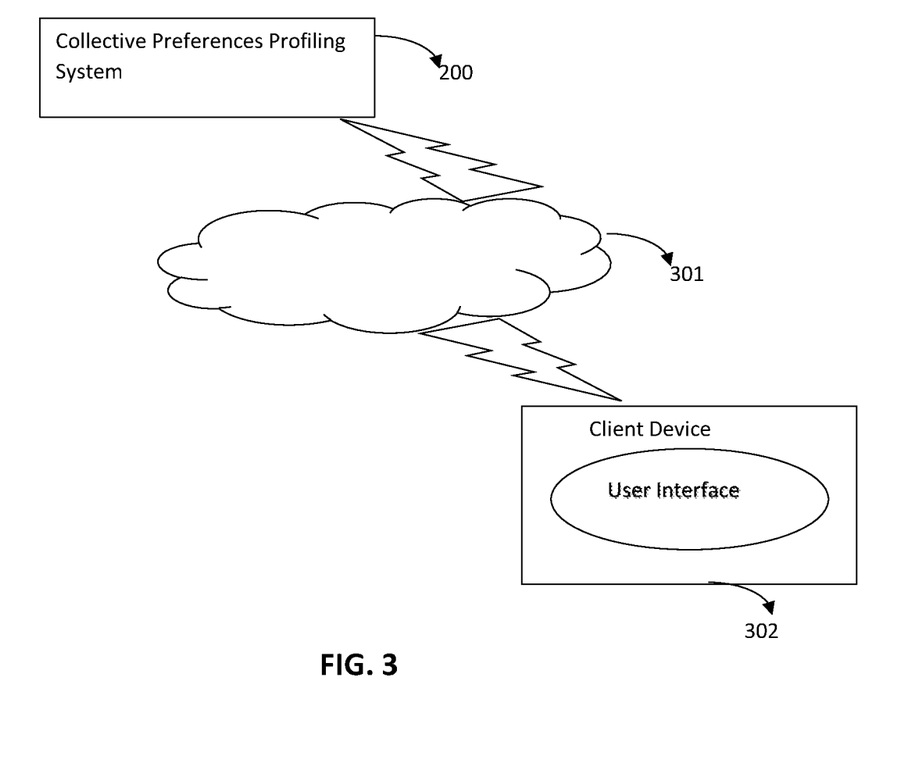
FIG. 3 illustrates the overall system architecture of the solution for engaging with a plurality of users in a real estate purchasing or renting activity.

FIG. 3 illustrates the overall system architecture that generates collective customer preferences and that presents purchase options to the user. The setup includes a collective preferences profiling system 200. The system illustrated in FIG. 3 may include one or a plurality of servers deployed at a single location, or distributed geographically. For example, in one embodiment the collective preferences profiling system 200 may be deployed on a cloud-based system. The collective preferences profiling system 200 includes modules, databases, computing resources etc. necessary to implement the techniques of collective preference generation disclosed herein, as one of ordinary skill in the art would understand.

A client device 302 may take various forms, such as my smart phone, a tablet device, a PC, a laptop, etc. for the purposes of description, the client device 302 comprises a smart phone. Among other components, the smart phone 302 may be equipped with a user interface agent, which may take the form of a web browser. A smart phone may be communicatively coupled to the collective preferences profiling system 200 by means of an intermediate wide area network 301. In one embodiment, the intermediate wide area network may represent various technologies including Internet, and wireless networking technologies. For example, using a smart phone, the user may launch a "collective preference application" provisioned in the smart phone.

Described herein is a method by which more than one person is enabled to actively participate in the purchase of a house.

Each person is enabled to create their custom profile capturing their individual preferences at an attribute level utilizing both written and visual profiles. This is achieved either through a questionnaire or a visual medium. The user is taken through a visual and a verbal feedback system to create a custom preferences profile that can be utilized to recommend the most relevant homes to them.

A collective preferences profile (CPP) may be generated by a CP module 203 by integrating the multiple individual preference profiles of the chosen deciding users. The collective preferences profile is utilized to curate the different houses available and surface those houses that are most likely to fit the aesthetic and combined functional requirements of the audience. In addition, a weightage per person may be allocated for specific areas (kitchen, garden etc.) to adjust the preference scale.

In this section we highlight an application to determining group preferences. Suppose we are looking to determine a group preference for k distinct users I. The space of products is approximated to be a finite dimensional vector space. The standard basis for this space is defined to be a collection of all learning units. Hence, every product can be defined uniquely using only the learning units. For every product P and every learning unit L, there exists a unique l' in L such that p is the intersection of all l'. The space of all products can be approximated by the collection of all attributes. Group some attributes together and consider it as a coordinate axis on the before mentioned space. A single learning unit may be represented as a single coordinate axis on the space, and the collection of all coordinate axes represents the entire product space.

Assume n distinct learning units, L. Furthermore $\ddagger l \in L \, \exists m$ distinct attributes $\{l_1, l_2, \ldots, l_m\}$. Define a basket, b, to be a collection of attributes $$l_m^m$$

where $l_{m\,j}^m$ is an attribute in learning unit $m$ with attribute value $m_j$. Recall above that a user's individual preference could be determined via an application of Bayes Rule. In particular determine the probability that a user will click on a given product. This defines a rank order over the space of Baskets, B. For any user, $i \in I$, define the utility function, $U_i$, $$U_i(b) = \frac{P(b)}{\Sigma_{\tilde{b} \in B} P(\tilde{b})}$$

Where, P(b), is the click probability defined before. Further define the group utility function, $$U = \Sigma U_k$$

To find the optimal basket across k users, maximize the group utility function, $$\max_{b \in B} U$$

As the objective is to maximize a joint utility function, when players want to consider only a subset of the universe of baskets, first determine for each player, i, their restricted space of baskets, $B_i$.

Consider the joint restricted space, $$B = \prod_{i=1}^{k} B_i$$

To find the optimal basket across k users, maximize the group utility function on the restricted space, $$\max_{b \in B} U \qquad (1)$$

Another situation to consider is when certain individuals in the group have more influence in the decision making process. In this case individual utility functions are weighted accordingly. Consider again the restricted space, $B_i$. Define individual weights, $0 \leq w_i \leq 1$ and, $$\sum_{i=1}^{k} w_i = 1$$

In this situation, consider the weighted joint utility function, $$U_w = \Sigma w_k \cdot U_k$$

To consider both situations of restricted baskets and variable utility, solve the following maximization equation, $$\max_{b \in B} U_w$$

The collective preferences profile evolves on an ongoing basis by active solicitation of feedback on properties viewed or waitlisted to accommodate changing preferences and provide the most suited recommendation at any time.

The preferences are exposed to the user, and the user engages with the exposed preferences and fine tunes the preferences.

The agreement scores of user preferences are displayed to the users, whereby the users can actively reconcile amongst themselves. For example, if there are more than two people, people who like open kitchen, for example say 60% of the group may desire open kitchens. The provision of these agreement scores becomes important when there are more than two people. The reconciliation module performs the reconciliation on being asked to. When there are contrasting inputs on preferences, the reconciliation module plays a major role. For example, consider a situation wherein when one person desires an open bathroom, whereas another person likes a bathroom with a bath tub. The reconciliation module will then attempt to identify a property with one open bathroom and one bathroom with a bathtub. However, if one person wants a kitchen island and the other desires a kitchen counter, the contradicting preferences cannot be reconciled by the reconciliation module as there is typically space for only one kitchen concept. The reconciliation module will put forth a question to the participants that they would have to reconcile amongst themselves and provide their compromised choice to the system. In this case, typically, the person who uses the space most often will be given a higher preference. In another exemplary case, John Smith may have a strong preference for a certain garage type that he frequently uses whereas Mary Smith may not be particularly interested in the garage type. John Smith's preference will then prevail in the final selection of the garage type.

The reconciliation process is described herein in detail. The reconciliation process supports collaborative preference elicitation where desired features have to be chosen individually, but group consensus is needed for them to become active. Given a set of objects and a set of user preferences, both defined over a set of categorical attributes, the Multiple Categorical Preferences (MCP) problem is to determine the objects that are considered preferable by all users. One of the main similarity metrics is the Intersection over Union (IoU) which is a classic measure of similarity between two sets. For each home, the set of unique people visited is extracted. By having those sets, for each pair of homes, the intersection set and union set is computed. The index is derived by dividing the intersection set size by the size of the union set. The derived number is used as the similarity between the two homes. For a new home listing that comes to the market (fresh and unvisited), the challenge is to predict its similarity to the current listings.

A text extraction algorithm is applied to the non structured textual input of a seller on the website to capture information about the property, and use the visual extraction on top of it to identify parameters not identified by the text. For example, the seller will input a written description of the property including the nearby schools, size of the property, amenities in the property etc. The text extraction algorithm will be applied to the input text of the seller and will tag the attribute list to the property. For example, the system can prioritize properties that have a kitchen island versus those that do not have a kitchen island.

A text extraction algorithm is described herein. Each real estate listing scraped contains a text component, for example, an ad description. The descriptions are actually previews of the full descriptions, scraped from the listing page. After scraping the description preview for all real estate listings, we are left with text samples. A document is the entire text for each record, or observation, in our dataset. Each real estate listing advertisement represents one observation, so each advertisement's description text is a unique document. The corpus is the collection of all advertising listing documents. Tokenization involves splitting advertisement text into its smallest components, called tokens. The component tokens from the advertising listing are subjected to lemmatization and stemming to reduce the words to their root. Extract n-grams, which are token groups of commonly appearing important words in the advertising listing. Conduct visualization of n-grams to identify the dominant words in the advertising listing. Additional real estate-specific stop words and numeric tokens are removed to avoid redundant information. Create word clouds for different range (types) of houses and the description of the houses associated with them. The data so prepared from the above sequence is subject to a machine learning model using a TF-IDF vectorizer, and identify those features that impact the real estate model.

A taxonomy of the most preferred attributes are built that maximizes the impact on a purchase decision. A constant reconcile explicit button will be available on the website that can be accessed anytime and at any location in the user journey on the website. The reconcile button is typically used when there are contradicting inputs by multiple users that need to be reconciled. Automatic reconciliation is performed for preferences than can be logically reconciled, and manual reconciliation is performed when contrasting preferences cannot be logically reconciled given the limited options.

Figure 1:
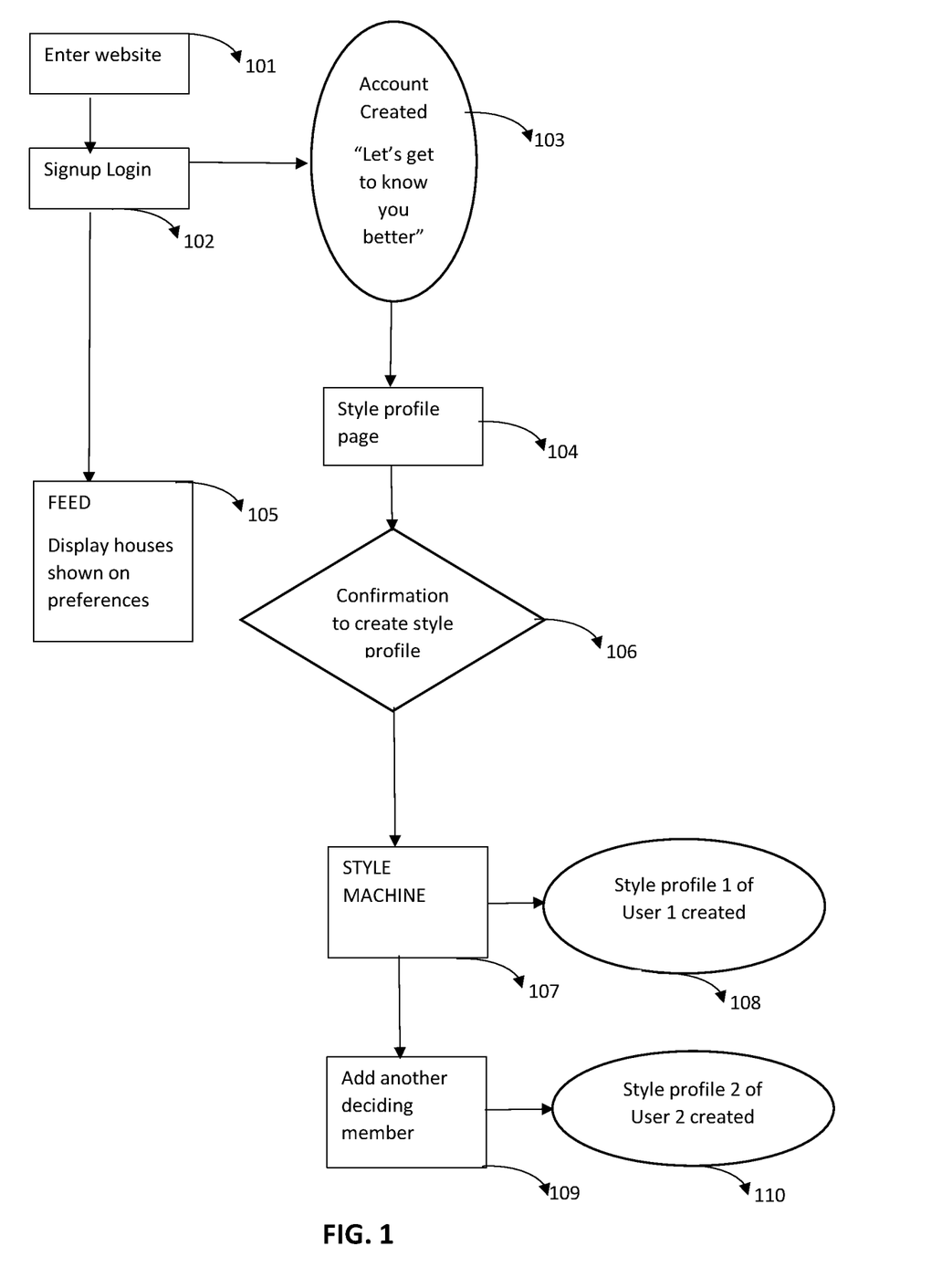
FIG. 1 illustrates a method of engaging with a plurality of users in a real estate purchasing or renting activity.

FIG. 1 illustrates a method of engaging with a plurality of users in a real estate purchasing activity to display houses based on their preferences 105. User 1 lands on the website 101 and is taken through the signup 102 or login page. After signing up, an account is created for User 1, 103. A call to action module is put into play to get to know User 1's preferences. User 1 is led to a dedicated style profile page 104 with a confirmation to create 106 a style profile with a textual questionnaire, and User 1 is taken through to a style machine 107 to capture his or her style profile. If User 1 is not satisfied with their captured style profile, they can actively change it. Visual feedbacks from User 1 are used for items that cannot be captured by textual inputs, such as a large swimming pool, or for example if it's a condo or a ranch house, or the color of a carpet or woodwork. The style machine is capable of working on a combination of a questionnaire and visual feedback, and once the feedback is provided, a style profile 1 is created 108 in the database for User 1. If more than one person is involved in the decision making, for example if there is a User 2, then the option to add another person 109 is provided. In a similar process, a style profile 2 is generated for user 2, 110. The user preferences of a collective group with agreement scores are actively displayed to User 1 and User 2, and allows the users to actively reconcile contradictions between themselves.

The individual profiles and the CPP are placed in an explicit framework that the user can engage with and can fine tune the collective preferences on an ongoing basis.

If the style profile for user 1 has already been generated, then after the login stage, User 1 advances to reviewing the houses shown based on their earlier captured preferences. At this stage, User 1 may optionally add another person User 2 and a style profile of User 2 is created.

Preferences may be changed by the user. For example, a user may first want a carpet, however on visiting a house the user may decide otherwise. In this case, the user may change their preference for a carpet to a hard floor in their style profile at a later point in time.

In many cases, the user may not necessarily have clarity about their requirements from the real estate property. In this case, they are provided an option to use a "prebuilt persona". This prebuilt profile is a ready-made style in the style machine for ready integration into the user's style profile. Prebuilt Personas are a selection of personas that have prebuilt preferences such as athlete, expectant mother etc. The user can choose the persona that matches them the closest which would then be integrated with their custom preferences profile to create a more targeted profile.

The method of building personas is described herein. Data-driven home buyer personas comprise a large collection of information which derives its data content from a variety of structured, unstructured, and semi-structured data sources. Aggregated behavioural and demographic customer data, as well as consumers of a product, service, system, or content can be collected from major online platforms and can be rapidly analysed to identify customer segments that are usable for the home purchasing activity. Quantitative data and qualitative information derived from focus groups and interviews can help complete the picture of the house buyer. Consider the parameters, viz., location, age, income, family situation, education, and occupation. Integrate the associated behavioural customer segments and the demographic customer segments. A home buyer customer segment interacts with the set of data content from a variety of structured, unstructured and semi-structured data sources which is a matrix as the basis. The rows of the matrix of behavioural facets could be interpreted as "Homebuyers", "Long-term investors", "Buy-to-let investors" and so on. On the other hand, the matrix of intrinsic facets could be interpreted as "high-income group", "upper-middle-income group", "lower-middle-income group", and "low-income group".

Applying the methodology described above, elicit the age, gender, and location for each behavioural segment, as well as their behavioural pattern, which become the basis of the personas; however, add other information to build actual "imaginary people"; this information includes name, photo, and topics of interest, corresponding to a typical persona representation.

Only after the collective preferences is created, and after the two profiles are merged, the commonalities and contradictions are identified, and the reconciliation is conducted after the collective preferences are generated. For example, a dancer may choose the persona of a "dancer" and the style profile recommended will include a large floor area to conduct their regular dance exercises. A house with a converted garage in this case may be apt for the dancer. In another example, a professional cook or a food blogger will need a lot more pantry space than a normal person.

When the online user lands on the target website, the call to action will state "if you are shopping with another person, click here". This call to action is provided as either a prompt or an announcement on the website or at any other place on the user interface.

After the prompt is presented to the user, the user may opt to click on the prompt, and this takes the user to a dedicated page on the website. The before mentioned page may be accessed directly by circumventing the first prompt, this may be available as a menu item on the top of the website or as a navigation unit for direct access without a prompt. The link will lead the user to a dedicated page that will take them through the process of identifying their individual and combined style of purchase.

When the user gives the consent to proceed when presented with the call to action, the style machine is activated. The style machine, as a grid of products with or without an interactive engagement module, is presented to the user to engage with to provide their feedback. Hence, the first user is taken through the style machine with or without an interactive engagement module. The interactive engagement module is utilized if the browsing activity is performed at an attribute level.

The Interactive Engagement Module (IEM) is exposed in an engaging way to the users only when the user indicates a subtle or open interest in the entity shown either by hovering or clicking. The user has complete control over their choice to either engage or not engage with the Interactive Engagement Module. The specific attributes to be used in the IEM from the list of attributes for any entity is chosen by the owner of the ecosystem based on what they want to understand about their audience or the entity. If the browsing activity is not performed at an attribute level, the interaction is performed at a higher product level, for example with a "thumbs up" or "thumbs down" action to collect feedback on style preferences.

A user's taste profile may be determined based on quickly exposing the user to a plurality of product images, and allowing the user to interact with those images in order that the system may determine a taste profile for the user. As described, a user taste profile may be constructed based on product affinities. Additionally, in some embodiments, a product exploration process may be executed in order to uncover additional products over and beyond what would ordinarily be recommended based on product affinities.

Next the custom profiling module is activated. The custom profiling module in the server receives the attribute or product feedback from the first user, and the custom profile for the first user is thereby generated. In a similar process as illustrated above for the first user, the second user's custom profile is also generated by initiating the style machine module. Once the CTA module 201 receives the confirmation on the number of profiles 105 to be collectively used, the style machine module 202 runs the algorithm to analyse the style profile of the users, and creates a new integrated style profile based on the identified commonalities at an attribute level and the derived insights. A recommendation engine 204 generates and presents the curated product to the users based on their integrated style profile. A reconciliation module 205 resolves contradictions between preferences of users.

In one embodiment, a user's style profile evolves with each interaction recorded by the style machine. Advantageously, the user style profile is highly detailed and collects preference information at the attribute level (attributes are the finest level of detail in the taxonomy). The user style profile may be represented as a multi-dimensional vector that is highly sensitive to both the direction of feedback (positive/negative), and degree (e.g., like, love, as well as the count of each). Advantageously, the user style profile is determined based on the user's current preferences and used by the recommender in order to output a recommendation to the style machine. Responsive to receiving the recommendation, the style machine changes the image associated with the slot in respect of which user input has been received.

Taxonomy provides structure to the data set to 'sample' from and collect feedback from the user on. In some embodiments, the taxonomy may include additional dimensions such as price. User feedback against these attributes are used to create the user style profile (also referred to herein as a "user taste profile").

The processing steps described above may be implemented as modules. As used herein, the term "module" might describe a given unit of functionality that can be performed in accordance with one or more embodiments of the present invention. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the invention are implemented in whole or in part using software, in one embodiment, these software elements can be implemented to operate with a computing or processing module capable of carrying out the functionality described with respect thereto. After reading this description, it will become apparent to a person skilled in the relevant art how to implement the invention using other computing modules or architectures.

In general, the modules/routines executed to implement the embodiments of the invention, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, USB and other removable media, hard disk drives, optical disks (e.g., Compact Disk Read-Only Memory (CD ROMS), Digital Versatile Disks, (DVDs), etc.), flash drives among others.

Modules might be implemented using a general-purpose or special-purpose processing engine such as, for example, a microprocessor, controller, or other control logic. In the illustrated example, the modules could be connected to a bus, although any communication medium can be used to facilitate interaction with other components of computing modules or to communicate externally.

The computing server might also include one or more memory modules, simply referred to herein as main memory. For example, preferably random-access memory (RAM) or other dynamic memory, might be used for storing information and instructions to be executed by processor. Main memory might also be used for storing temporary variables or other intermediate information during execution of instructions to be executed by a processor. Computing module might likewise include a read only memory ("ROM") or other static storage device coupled to bus for storing static information and instructions for processor.

The database module might include, for example, a media drive and a storage unit interface. The media drive might include a drive or other mechanism to support fixed or removable storage media. For example, a hard disk drive, an optical disk drive, a CD, DVD or Blu-ray drive (R or RW), or other removable or fixed media drive might be provided. As these examples illustrate, the storage media can include a computer usable storage medium having stored therein computer software or data.

In alternative embodiments, the database modules might include other similar instrumentalities for allowing computer programs or other instructions or data to be loaded into the computing module. Such instrumentalities might include, for example, a fixed or removable storage unit and an interface. Examples of such storage units and interfaces can include a program cartridge and cartridge interface, a removable memory (for example, a flash memory or other removable memory module) and memory slot, a PCMCIA slot and card, and other fixed or removable storage units and interfaces that allow software and data to be transferred from the storage unit to computing module.

The communications module might include various communications interfaces such as an Ethernet, network interface card, WiMedia, IEEE 802. XX or other interface), or other communications interface. Data transferred via communications interface might typically be carried on signals, which can be electronic, electromagnetic (which includes optical) or other signals capable of being exchanged by a given communications interface. These signals might be provided to communications interface via a channel. This channel might carry signals and might be implemented using a wired or wireless communication medium. Some examples of a channel might include a phone line, a cellular link, an RF link, an optical link, a network interface, a local or wide area network, and other wired or wireless communications channels.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A computer implemented method of determining collective preferences of a plurality of users engaged in purchase or rent of a real estate property, comprising the steps of:
   presenting, via a user interface on a client device, a call to action to a first user, wherein the call to action includes a prompt or announcement regarding whether the first user wants to include a second user or the plurality of users in a purchasing decision;
   presenting, via the user interface, a textual questionnaire and visual media to the first user;
   receiving, via the user interface, textual inputs associated with the textual questionnaire and visual inputs associated with the visual media from the first user;
   generating, by at least one processor, a custom profile for the first user based on the received textual inputs and the visual inputs received from the first user, wherein the first custom profile includes custom preferences of the first user;
   determining, by the at least one processor, whether the second user or each of said plurality of users are to be included in the purchasing decision based on the presented call to action to the first user;
   controlling, by the at least one processor, interaction with said second user or each of said plurality of users in both textual and visual media based on the determination that the second user or each of the plurality of users are to be included in the purchasing decision;
   generating, by the at least one processor, a custom profile for said second user or each of said plurality of users, wherein the custom profile for said second user or each of said plurality of users-includes custom preferences of said second user or each of said plurality of users;
   determining, by the at least one processor, a contradiction between the custom preferences of two or more of said plurality of users;
   reconciling, by the at least one processor, the determined contradiction between the custom preferences of said two or more of said plurality of users;
   creating, by the at least one processor, a collective preferences profile by integrating multiple individual custom profiles of said plurality of users;
   curating, by the at least one processor, a plurality of available real estate properties and surface at least one real estate property of the plurality of available real estate properties based on said collective preferences profile and the reconciling; and
   controlling, by the at least one processor, presentation of the least one real estate property to said first user.

2. The computer implemented method of claim 1, wherein said step of creating the collective preferences profile further comprises the steps of:
   determining an utility function of each of said users, U_i, wherein $$U_i(b) = \frac{P(b)}{\Sigma_{b' \in B} P(b')}$$

and
   wherein P is a probability that a user will click on a given product, and wherein basket, b, is a collection of attributes $$b = \left(1\tilde{m}_j\right)$$

where $1\tilde{m}_j$ is an attribute in learning unit $\tilde{m}$ with attribute value $\tilde{m}_j$;
   determining a group utility function, U, wherein $$U = \Sigma_{k=1}^{k} U_k ; \text{ and}$$

maximizing the group utility function by performing the operation $$\max_{b \in \tilde{B}} U$$

to optimize the basket across K users on a joint restricted space, wherein $\tilde{B} = \Pi_{i=1}^{k} \tilde{B}_i$, and wherein $\tilde{B}$ is the joint restricted space of baskets $\tilde{B}_i$.

3. The computer implemented method of claim 1, wherein said first user is presented with a choice as the prompt to confirm whether the custom profile of said second user or the custom profile of said plurality of users can be collectively used for selecting said at least one real estate property.

4. The computer implemented method of claim 1, wherein each of said plurality of users are provided an option to use a prebuilt persona, and wherein said prebuilt persona is a ready-made style for ready integration into the custom profile of said each user.

5. The computer implemented method of claim 4, further comprising applying a decomposition process that yields a first matrix representative of facets of intrinsic facets and a second matrix representative of facets of behavioural facets for said prebuilt persona.

6. The computer implemented method of claim 5, wherein rows of said second matrix of said behavioural facets is interpreted as "Homebuyers", "Long-term investors", or "Buy-to-let investors".

7. The computer implemented method of claim 5, wherein said first matrix of said intrinsic facets is interpreted as "high-income group", "upper-middle-income group", "lower-middle-income group", and "low-income group".

8. The computer implemented method of claim 1, wherein said collective preferences profile evolves on an ongoing basis by active solicitation of feedback on properties viewed or waitlisted to accommodate changing preferences of said plurality of users, and providing the most suited recommendation.

9. The computer implemented method of claim 1, wherein for each real estate, the custom preferences of said first user and the custom preferences of said second user or the plurality of users visited is extracted, and an intersection set and union set of the custom preferences of said first user and the custom preferences of said second user or the plurality of users is computed, and wherein an index is derived by dividing the intersection set size by the size of the union set for an indication of similarity between the plurality of available real estate properties.

10. The computer implemented method of claim 1, further comprising the step of allocating weightage to adjust said preference when there are multiple decision makers, wherein said weightage is allocated per person for a specific area or attribute within the real estate property; and wherein said step of creating the collective preferences profile by integrating multiple individual preference profiles of said plurality of users, further comprises the steps of:

determining an utility function of each of said users, $U\_i$, wherein $$U_i(b) = \frac{P(b)}{\sum_{\hat{b} \in B} P(\hat{b})}$$

and wherein P is a probability that a user will click on a given product, and wherein basket, b, is a collection of attributes $$b = (1^m{}_{m_j})$$

where $1m_j\, m$ is an attribute in learning unit $m$ with attribute value $m_j$;

determining a group utility function, U, wherein $U = \sum_{k=1}^{k} U_k$; and maximizing the group utility function by performing the operation $$\max_{b \in \tilde{B}} U$$

to optimize the basket across K users on a joint restricted space, wherein $\tilde{B} = \Pi_{i=1}^{k} \tilde{B}_i$, and wherein $\tilde{B}$ is the joint restricted space of baskets $\tilde{B}_i$.

11. The computer implemented method of claim 1, wherein a text extraction algorithm is applied to non-structured textual input received from a seller of one real estate property of said available real estate properties on a website to capture information about said one real estate property, and in addition utilize visual inputs of said seller to identify parameters not identified by the text.

12. The computer implemented method of claim 11, wherein said text extraction algorithm comprises creation of word clouds for different range of real estates and reviews descriptions of houses associated with them, and wherein said word clouds and said description is subject to a machine learning model using a TF-IDF vectorizer, and determine those features that impact a real estate model.

13. The computer implemented method of claim 1, wherein a taxonomy is built of most preferred attributes of the available real estate properties that have a significant impact on a purchase decision.

14. The computer implemented method of claim 1, wherein each of said individual custom profiles and said collective preferences profile are placed in an explicit framework that the first user can engage with, and the first user can fine tune the collective preferences profile on an ongoing basis.

15. A system for generating collective preferences of a plurality of users engaged in purchase or rent of a real estate property, comprising:

at least one processor;

a non-transitory computer readable storage medium communicatively coupled to said at least one processor, said non-transitory computer readable storage medium configured to store computer program instructions, the computer program instructions cause said at least one processor to:

generate prompts, on a website, for said plurality of users to include one more other users for collective shopping;

analyse custom profiles of each of said plurality of users, wherein the analysis includes presenting product or service options to each of the plurality of users;

record each of the analysed custom profiles of said plurality of users based on the presented product or service options, wherein each of the custom profiles comprising custom preferences of a respective user of the plurality of users;

determine a contradiction between the custom preferences of two or more of said plurality of users;

resolve the determined contradiction between the custom preferences of said two or more of said plurality of users;

generate an integrated style profile of the plurality of users by integrating multiple individual custom profiles of said plurality of users; and generate and present a curated product to be displayed to said plurality of users based on said integrated style profile and the resolved contradiction.

16. The system of claim 15, wherein said system is a cloud based system with a collection of computer servers.

17. The system of claim 15, wherein said call to action is appended as a link on a product page of the website, wherein said link may be accessed directly by circumventing the prompts.

18. The system of claim 15, wherein said generation of integrated custom profile of said plurality of users is conducted at an attribute level.

19. The system of claim 15, wherein said generation of integrated style profile of said plurality of users is conducted at a product level.

20. The system of claim 15, wherein the website is a dedicated website to pursue the collective shopping.

* * * * *